United States Patent Office 2,932,574
Patented Apr. 12, 1960

2,932,574

MONOGLYERCIDE AQUEOUS EMULSION AND PROCESS OF PREPARING SAME

Robert C. Bour, Dolton, Ill.

No Drawing. Application January 6, 1958
Serial No. 707,113

12 Claims. (Cl. 99—118)

My invention is directed to the production of new and useful compositions of matter which contain monoglycerides of fat-forming fatty acids.

Present day commercial monoglyceride products, generally speaking, fall into two categories. In one category are those products which contain of the order of 45 to 60% monoglycerides, or somewhat more or less, the balance comprising diglycerides and a smaller percentage of triglycerides, and, commonly, a few percent of free glycerin. They are commonly made by reacting a triglyceride oil or fat, for instance, lard or tallow or corn oil or cottonseed oil, with glycerine in the presence of a catalyst, usually an alkaline catalyst such as sodium hydroxide. They are sometimes made by reacting glycerin with a fat-forming fatty acid in the presence of a catalyst, commonly an alkaline catalyst such as sodium hydroxide. U.S. Patents Nos. 2,206,167 and 2,206,168 show typical procedures for making such monoglyceride products.

In the second category are the so-called distilled monoglyceride products. They are characterized by having a much higher monoglyceride content, commonly of the order of about 90% or more, the balance usually comprising diglycerides and unreacted glycerine. Such products are currently being marketed and, for the past several years have been marketed, under the name "Myverol" (Distillation Products Company), different "Myverol" products being derived from different fat-forming fatty acids or commercial mixtures thereof. Methods of manufacture thereof are disclosed, for instance, in U.S. Patents Nos. 2,634,278; 2,634,279; 2,701,769 and 2,727,-913. Typical of such "Myverol" products are "Myverol 18–20," "Myverol 18–05" and "Myverol 18–85" which are distilled monoglycerides of approximately 90% monoglyceride content derived from glycerine and lard, triple pressed stearic acid and cottonseed oil, respectively.

Monoglycerine products of the foregoing types, which are actually mixtures of monoglycerides and diglycerides or mixed mono- and di-glycerides, are in wide commercial usage for a number of purposes, but one of the larger uses is in the bakery field where they are incorporated into dough batches for bread, rolls, buns and cakes for performing functions well known in the art. It is one common practice to sell the monoglyceride products of the type which fall into the first category to the baker "as is" for incorporation into the dough batch, although not uncommonly said monoglyceride products are pre-mixed with water and sold in that form as a paste or the like. The "Myverol" type of monoglyceride product, on the other hand, is conventionally sold in admixture with lard, where said monoglyceride is intended for use in the bakery field, because in that form it will mix with the water of the dough batch whereas, if sought to be used as such, it will not satisfactorily so mix. It is also common practice to sell compositions for use in the bakery trade which include, in conjunction with mono- and/or diglycerides, such ingredients as flour, lecithin and various supplemental ingredients.

If a monoglyceride product containing of the order of about 90% or more of monoglyceride, exemplified by the "Myverols," is sought to be mixed or blended with water, it is impossible to produce a smooth or homogeneous dispersion. Thus, for instance, the use even of hot to boiling water, high shear mixing such as with a "Waring Blendor," and various ratios of such high monoglyceride products to water result in the production of swollen, gummy masses of the monoglyceride product floating in the water. The problem of obtaining dispersion in water of the monoglyceride products of the type which contain of the order of 45 to 60% monoglycerides is far less acute but, even here, to render the same self-emulsifying it has been the practice to add an alkaline material such as soap. See, for instance, U.S. Patent Reissue No. 20,361.

In using the aforesaid monoglyceride products in the bakery field, it is conventional for the baker to add the same in requisite amounts to the dough mixer along with the various other ingredients comprising the dough batch. The mixing time is limited to a few minutes, it being well known that overmixing tends to have an adverse effect on the dough. The limited mixing time not infrequently is insufficient to bring about maximum dispersion of the monoglyceride product throughout the dough. It is at least in part for this reason that the monoglyceride products of the first category are sometimes supplied to the bakery in the form of an aqueous dispersion since, when so incorporated into the dough batch, the effectiveness of the monoglyceride tends to be enhanced.

The practice of my invention, hereafter described in detail, brings about marked improvements in the utilization of monoglyceride products, with especial emphasis in the bakery field. I have discovered, in the first place, that monoglyceride products having a high content of monoglycerides of fat-forming fatty acids, such as 80 or 90% or more, exemplified more particularly by the "Myverols" or the second category monoglyceride products, can effectively be dispersed in water to provide smooth, homogeneous aqueous dispersions, in the form of pastes or otherwise. This is accomplished by admixing said monoglyceride product with water in the presence of certain salts, hereafter described in detail.

The salts which I have found to be effective for the purposes of the present invention are the water-soluble salts of sodium, potassium, ammonium, lithium (to wit the alkali metals), and calcium salts of acetic acid, propionic acid, citric acid, tartaric acid, gluconic acid and sorbic acid. Those of said salts which are relatively insoluble in water, for instance, calcium citrate and calcium tartrate, are unsatisfactory and are not included within the scope of my invention. Typical of the salts which are especially satisfactory are sodium acetate, calcium acetate, sodium propionate, calcium propionate, sodium citrate, ammonium citrate, sodium tartrate, potassium tartrate, and sodium sorbate. Sodium propionate and calcium propionate are exceptionally advantageous.

It is particularly advantageous to effect the admixing of the monoglyceride product with a relatively strong aqueous solution of any of the aforesaid salts or mixtures thereof at slightly elevated temperatures. Thus, for instance, equal weights of a 20% aqueous solution of calcium propionate and a 90% monoglyceride product ("Myverol 18–40" comprising a monoglyceride derived from lard) may be heated to 60–70 degrees C. while stirring vigorously, and then allowed to cool to form a smooth aqueous dispersion. Generally speaking, the amount of the salts, for example, the sodium or calcium salts of acetic, propionic and sorbic acids, necessary to achieve the proper results pursuant to my invention are of the order of at least about 5 to 6% by weight of the finished product; and, on the basis of the water used in the preparation of the aqueous dispersion, forms a strong solution. Thus, as indicated previously, and by way of example, excellent results are obtained by the utilization of equal parts by weight of "Myverol" and a 20% water solution of calcium propionate. This results in the production of a composition containing 10% calcium propionate and 50% of the monoglyceride product; and, of course, a 20% water solution of calcium propionate is a strong solution. Excellent results are also obtained with, for instance, 15 to 20% water solutions as well as stronger solutions, including saturated solutions, of sodium acetate, calcium acetate, sodium propionate and sodium sorbate, or others of the aforesaid salts, admixed with equal weights of the monoglyceride product. Materially lesser amounts of said salts, for instance, equal weights of the monoglyceride product in admixture with 1% to 5% water solutions of calcium propionate, are not sufficient to achieve the results of my invention. Nevertheless, the proportions of ingredients are variable within appreciable limits. Thus, for instance, using a 20% water solution of calcium propionate or sodium acetate or calcium acetate or sodium propionate, in admixture with a lard fatty acid monoglyceride product of about 90% monoglyceride content, smooth dispersions are obtained with relative proportions, weight, of 75 parts of said water solutions to 25 parts of the monoglyceride product, 60 parts of said water solutions to 40 parts of the monoglyceride product, and 40 parts of said water solutions to 60 parts of the monoglyceride product. Generally speaking, the compositions of my invention, in the form of smooth aqueous dispersions of the monoglyceride product, will ordinarily contain from 25 to 60% of the monoglyceride product and 7 to 35% of the aforesaid salts.

While my invention is especially concerned with the production of smooth aqueous dispersions of monoglyceride products in which the content of monoglyceride is of the order of at least 80% and, better still, at least 90%, nevertheless, as I have indicated above, the invention also has very distinct value in relation to the production of smooth aqueous dispersions from mixed mono- and di-glycerides in which the monoglyceride content is materially lower, namely, of the order of 45 to 60% or somewhat more or less, more rapid and complete dispersion occurring in comparison with plain water blends of mixed mono- and di-glycerides of the type falling into the first category discussed above. It is, indeed, surprising that such high concentrations of the aforementioned salts would blend at all with monoglyceride products since said monoglyceride products are generally regarded as being insoluble in strong solutions of inorganic salts, for example, sodium sulfate, sufficiently so, indeed, for such solutions to be used in a quantitative analytical method for separating the monoglyceride content of a product from water-soluble substances such as glycerine.

The following examples are illustrative of compositions falling within the scope of the invention. Other specific examples will readily occur to those skilled in the art in the light of the guiding teachings and principles disclosed herein. All parts listed are by weight.

*Example 1*

Lard fatty acid monoglyceride product (approximately 90% monoglyceride content—"Myverol 18–40") _____ 25
Calcium propionate _____ 25
Water _____ 50

*Example 2*

Lard fatty acid monoglyceride product (approximately 90% monoglyceride content—"Myverol 18–40") _____ 40
Calcium propionate _____ 30
Water _____ 30

*Example 3*

Lard fatty acid monoglyceride product (approximately 90% monoglyceride content—"Myverol 18–40") _____ 60
Calcium propionate _____ 15
Water _____ 25

*Example 4*

Lard fatty acid monoglyceride product (approximately 90% monoglyceride content—"Myverol 18–40") _____ 25
Sodium acetate _____ 15
Water _____ 60

*Example 5*

Lard fatty acid monoglyceride product (approximately 90% monoglyceride content—"Myverol 18–40") _____ 40
Sodium acetate _____ 12
Water _____ 48

*Example 6*

Lard fatty acid monoglyceride product (approximately 90% monoglyceride content—"Myverol 18–40") _____ 55
Sodium acetate _____ 15
Water _____ 30

*Example 7*

Mixed mono- and di-glycerides of tallow fatty acids (55% monoglyceride content) _____ 40
Calcium propionate _____ 25
Water _____ 35

*Example 8*

Lard fatty acid monoglyceride product (approximately 90% monoglyceride content—"Myverol 18–40") _____ 25
Calcium acetate _____ 15
Water _____ 60

*Example 9*

Lard fatty acid monoglyceride product (approximately 90% monoglyceride content—"Myverol 18–40") _____ 25
Sodium sorbate _____ 12
Water _____ 63

*Example 10*

Lard fatty acid monoglyceride product (approximately 90% monoglyceride content—"Myverol 18–40") _____ 40
Sodium sorbate _____ 9
Water _____ 51

*Example 11*

Lard fatty acid monoglyceride product (approximately 90% monoglyceride content—"Myverol 18–40") _____ 50
Calcium propionate _____ 15
Sodium propionate _____ 10
Water _____ 25

Example 12

| | |
|---|---|
| Lard fatty acid monoglyceride product (approximately 90% monoglyceride content—"Myverol 18–40") | 40 |
| Sodium propionate | 10 |
| Sodium acetate | 5 |
| Water | 45 |

Example 13

| | |
|---|---|
| Mixed mono- and di-glycerides of lard fatty acids (50% monoglyceride content) | 55 |
| Calcium propionate | 10 |
| Sodium propionate | 5 |
| Water | 30 |

Example 14

| | |
|---|---|
| Mixed mono- and di-glycerides of tallow fatty acids (55% monoglyceride content) | 40 |
| Calcium propionate | 6 |
| Sodium acetate | 3 |
| Sodium sorbate | 3 |
| Water | 48 |

In the preparation of the smooth aqueous dispersions of the present invention, it is convenient to add the aforesaid salt, or mixtures of salts, for instance, calcium propionate, to the water which has previously been heated to about 60 degrees C. The said calcium propionate solution is then admixed with the monoglyceride product and the mixture is agitated vigorously while maintaining the temperature at about 60 degrees C. to form a smooth dispersion, after which the dispersion is allowed to cool, preferably while continuing the agitation. In the usual case, the finished dispersion will be in the form of a soft solid, this depending however, upon the nature of the original monoglyceride product. In certain instances, the amount of calcium propionate or other similar salt may be greater than that which produces a saturated solution and the result will be that the calcium propionate or other salt solution will contain some undissolved or suspended particles of said salt. This will not interfere with the practice of the invention.

The compositions of our invention are highly effectively useful in those environments in which good dispersion of monoglycerides is an important desideratum and in which, of course, the content of the particular salt does not present any objectionable factor. The invention finds particular utility, as indicated above, in the baking field. Thus, my novel compositions can be incorporated into bread dough batches in appropriate proportions to obtain the desired percentage of monoglycerides. In a typical instance, 8 ounces of the composition of Example 7 per 100 pounds of flour in a conventional bread dough batch gave excellent results.

Over and above the advantages of my invention as pointed out above, there are still other important advantages, depending upon the particular salt or salts utilized. In this connection, it may be observed that it is known practice to employ such salts as sodium acetate, calcium propionate and sodium sorbate to inhibit mold growth in bread and similar baked goods. The conventionally used mold inhibitor in bread is calcium propionate, which is made by drying from an aqueous solution and, as supplied to the baker, is a dry powder which is dusty and irritating to the mucous membranes thus making for some difficulties in handling. Where calcium propionate is used in the making of the smooth aqueous dispersions of monoglyceride products pursuant to my invention, the resulting compositions possess the further advantages of an over-all cost saving, because the aqueous solutions of the calcium propionate need not be dried but may be used as such in the production of the smooth aqueous dispersions of the monoglyceride products, and the baker is spared the nuisance of working with and handling the dry calcium propionate powder.

What I claim as new and desire to be protected by Letters Patent of the United States is:

1. A new composition of matter comprising a smooth aqueous dispersion containing from about 25 to 60% monoglyceride of fat-forming fatty acids, and from about 7 to 35% of at least one water-soluble salt selected from the group consisting of alkali metal and calcium salts of acetic acid, propionic acid, citric acid, tartaric acid, gluconic acid, and sorbic acid.

2. A new composition of matter comprising a smooth aqueous dispersion containing from about 25 to 60% mixed mono- and di-glycerides of fat-forming fatty acids, the monoglyceride content of said mixed mono- and di-glycerides being 45 to 60% by weight, and at least one water-soluble salt selected from the group consisting of alkali metal and calcium salts of acetic acid, propionic acid, citric acid, tartaric acid, gluconic acid, and sorbic acid.

3. A new composition of matter comprising a smooth aqueous dispersion containing from about 25 to 60% of a fat-forming fatty acid monoglyceride product in which the monoglyceride content is of the order of at least 80%, and at least one water-soluble salt selected from the group consisting of alkali metal and calcium salts of acetic acid, propionic acid, citric acid, tartaric acid, gluconic acid, and sorbic acid.

4. A new composition of matter comprising a smooth aqueous dispersion containing, by weight, 25 to 60% monoglycerides of fat-forming fatty acids in which the monoglyceride content is upwards of 80%, and 7 to 35% of at least one water-soluble salt selected from the group consisting of alkali metal and calcium salts of acetic acid, propionic acid, citric acid, tartaric acid, gluconic acid, and sorbic acid.

5. A new composition of matter comprising a smooth aqueous dispersion containing 25 to 60% monoglycerides of fat-forming fatty acids, and 7 to 35% of calcium propionate.

6. A new composition of matter comprising a smooth aqueous dispersion containing, by weight, 25 to 60% of a monoglyceride product in which the monoglyceride content is of the order of at least 90%, and 7 to 35% of calcium propionate.

7. A method of preparing a new and useful composition of matter in the form of a smooth aqueous dispersion of mixed mono- and di-glycerides of fat-forming fatty acids, the monoglyceride content of said mixed mono- and di-glycerides being 45 to 60% by weight, which comprises admixing said monoglycerides with water, under agitation and heat, in the presence of at least one water-soluble salt selected from the group consisting of alkali metal and calcium salts of acetic acid, propionic acid, citric acid, tartaric acid, gluconic acid, and sorbic acad to produce a smooth aqueous dispersion containing from about 25 to 60% of said mixed mono- and di-glycerides and from about 7 to 35% of said salt.

8. A method of preparing a new and useful composition of matter in the form of a smooth aqueous dispersion of distilled monoglyceride products comprising monoglycerides of fat-forming fatty acids in which the monoglyceride content of said distilled monoglyceride products is in excess of 80%, which comprises admixing said monoglycerides with water in the presence of at least one water-soluble salt selected from the group consisting of alkali metal and calcium salts of acetic acid, propionic acid, citric acid, tartaric acid, gluconic acid, and sorbic acid to produce a smooth aqueous dispersion containing from about 25 to 60% of said monoglyceride product and from about 7 to 35% of said salt.

9. A method of preparing a new and useful composition of matter in the form of a smooth aqueous dispersion of distilled monoglyceride products comprising monoglycerides of fat-forming fatty acids in which the monoglylceride content of said distilled monoglyceride products is in excess of 80%, which comprises admixing said monoglycerides, under agitation and heat, with a strong aqueous solution of at least one water-soluble salt selected from the group consisting of alkali metal and calcium salts of acetic acid, propionic acid, citric acid, tartaric acid, gluconic acid, and sorbic acid to produce a smooth aqueous dispersion containing from about 25 to 60% of said monoglyceride product and from about 7 to 35% of calcium propionate.

10. A method of preparing a new and useful composition of matter in the form of a smooth aqueous dispersion of distilled monoglyceride products comprising monoglycerides of fat-forming fatty acids in which the monoglyceride content of said distilled monoglyceride products is at least 90%, which comprises admixing said monoglycerides, under agitation and heat, with a strong aqueous solution of calcium propionate to produce an aqueous dispersion containing from about 25 to 60% of said monoglyceride product and from about 7 to 35% of calcium propionate.

11. A method of preparing a new and useful composition of matter in the form of a smooth aqueous dispersion of monoglycerides of fat-forming fatty acids, which comprises admixing said monoglycerides, under agitation and heat, with an aqueous solution containing not substantially less than 20% by weight of calcium propionate to produce a smooth aqueous dispersion containing from about 25 to 60% of said monoglyceride product and from about 7 to 35% of calcium propionate.

12. A method of preparing a new and useful composition of matter in the form of a smooth aqueous dispersion of mixed mono- and di-glyceride of fat-forming fatty acids, the monoglyceride content of said mixed mono- and di-glycerides being 45 to 60% by weight, which comprises admixing said mono- and di-glycerides, under agitation and heat, with an aqueous solution containing not substantially less than 20% by weight of calcium propionate to produce a smooth aqueous dispersion containing from about 25 to 60% of said mixed mono- and di-glycerides and from about 7 to 35% of calcium propionate.

References Cited in the file of this patent

UNITED STATES PATENTS

| | | |
|---|---|---|
| 1,216,674 | Erslev | Feb. 20, 1917 |
| 2,085,134 | Wendt | June 29, 1937 |

OTHER REFERENCES

Hollenberg: "Surface-Active Agents in Cosmetic Practice," Soap, Perfumery & Cosmetics (S.P.C.), June 1947, pp. 562 to 566.

Distillation Products Industries, Rochester 3, N.Y., Division of Eastman Kodak Company, "Monoglyceride Gels," 3 pp.